March 6, 1962 E. H. VICKERY 3,023,783
BALL VALVE
Filed July 21, 1958 2 Sheets-Sheet 1
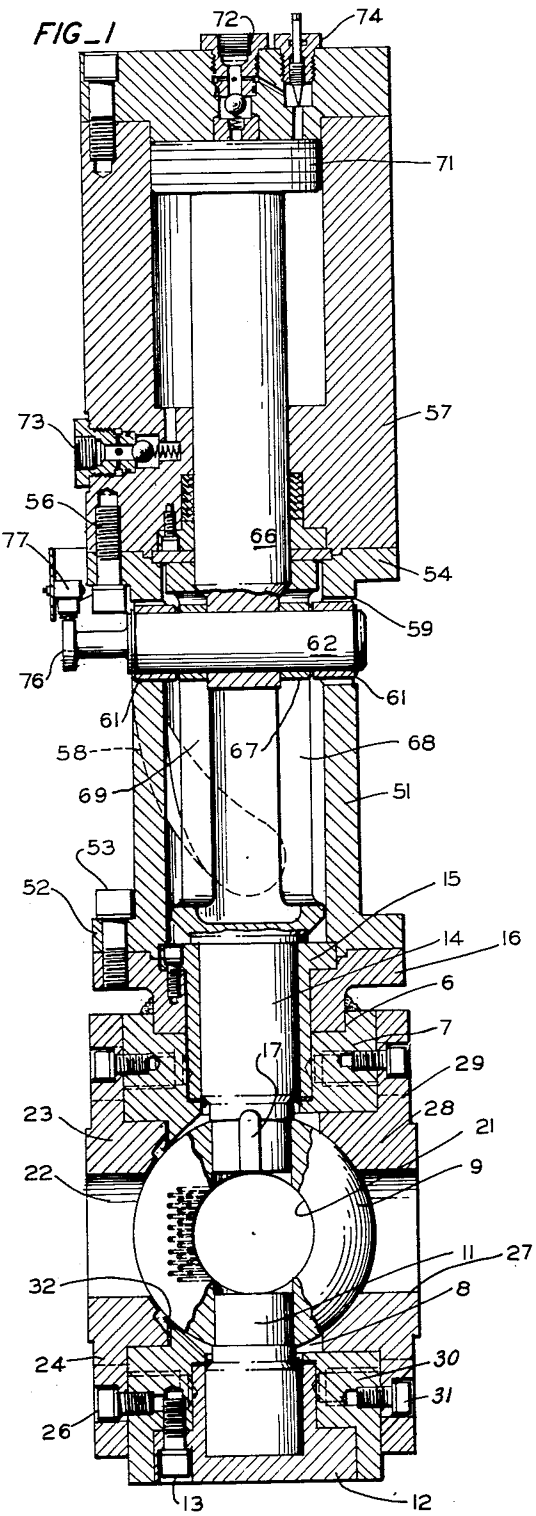
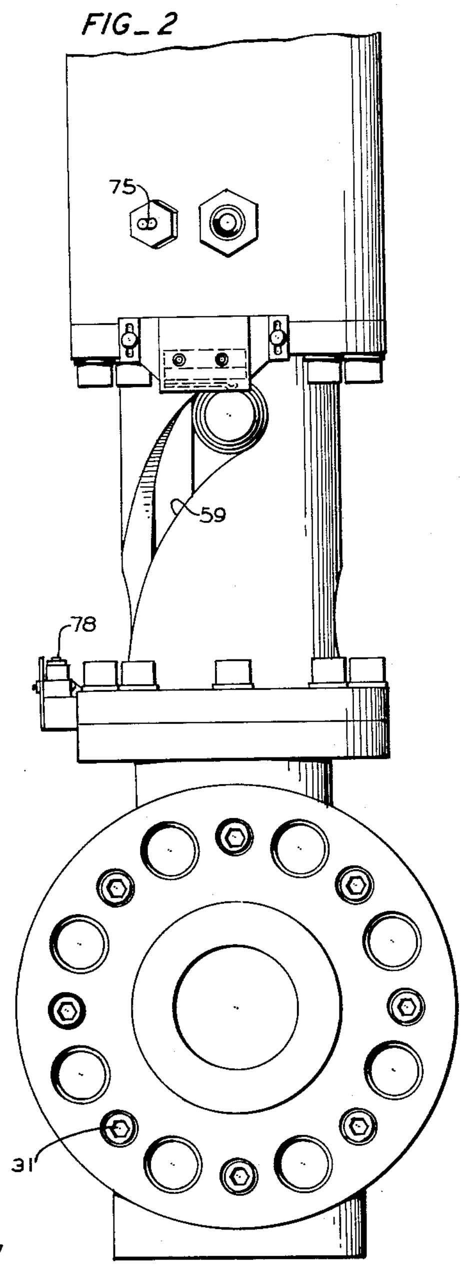
INVENTOR.
EDGAR HERBERT VICKERY
BY
Lothrop & West
ATTORNEYS March 6, 1962 E. H. VICKERY 3,023,783
BALL VALVE
Filed July 21, 1958 2 Sheets-Sheet 2
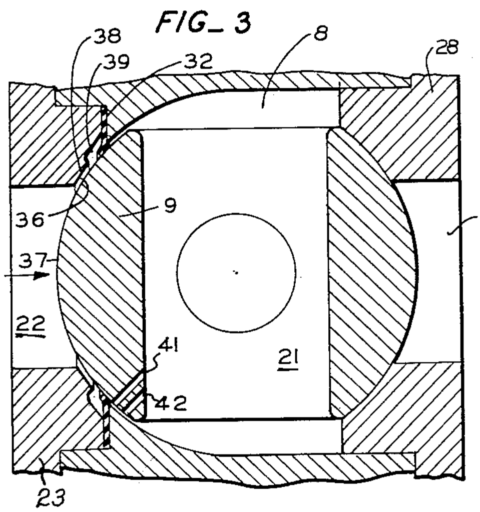
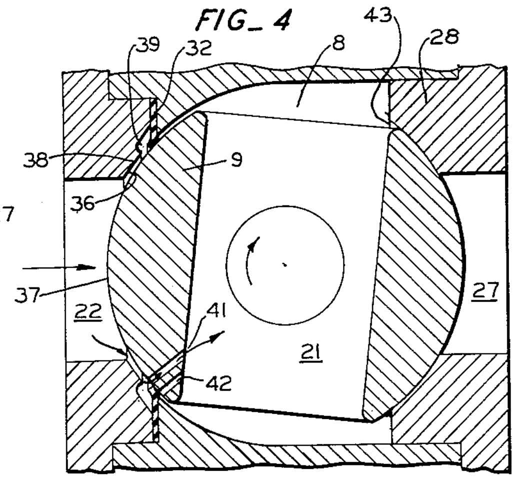
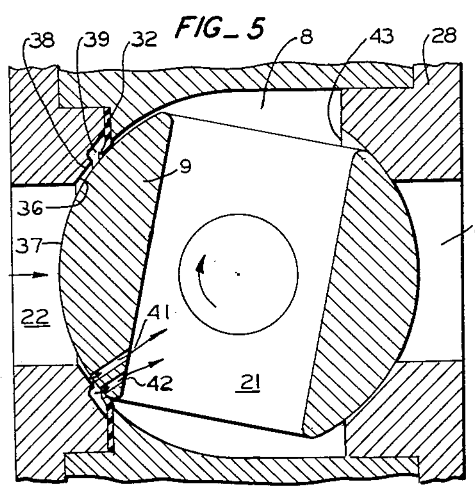
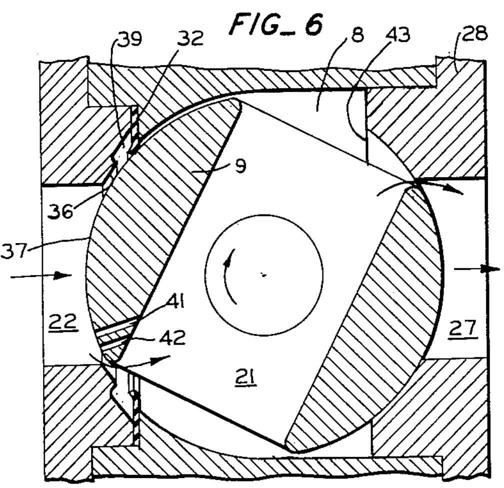
INVENTOR.
EDGAR HERBERT VICKERY
BY
Lothrop & West
ATTORNEYS United States Patent Office 3,023,783

Patented Mar. 6, 1962

3,023,783

BALL VALVE

Edgar Herbert Vickery, Oakland, Calif., assignor to Fisher Governor Company, Marshalltown, Iowa, a corporation of Iowa Filed July 21, 1958, Ser. No. 749,770

5 Claims. (Cl. 137—625.12)

My invention relates primarily to valves especially useful at present in missile and rocket installations and capable of dealing with liquids and gases such as helium at very low temperatures and high pressures and with liquid oxygen at quite elevated pressures. While, as shown in my copending applications entitled Ball Valve, Serial No. 614,842, filed October 9, 1956, and Liquid Oxygen Valve and Actuator, Serial No. 677,617 filed August 12, 1957, now abandoned, valves of this sort have already been constructed and operated successfully, the present tendency is to require increasingly high pressures for valve functioning. For example, a representative intermediate pressure now is ten thousand pounds per square inch and advanced valves are required to operate at pressures of the order of twenty thousand pounds per square inch. It has been possible to provide valves of the sort indicated which are drop tight when closed and which can be opened to afford a relatively free flow possage and so are satisfactory from those aspects. However, the power or force required to move the valve between closed and open positions becomes increasingly greater so that the actuator and actuator power are unwieldy and excessive.

It is, therefore, an object of the invention to provide some means for reducing the power requisite to operate a ball valve.

Another object of the invention is to provide a ball valve which can operate under extreme conditions yet which can be moved between closed and open positions with considerable ease.

Another object of the invention is to provide a ball valve which seals tightly in its closed position yet which can be readily moved in either direction between open and closed positions with a relatively small force.

Another object of the invention is to provide a ball valve that is readily moved yet does not depart from the general layout and operating principle of valves already known.

A still further object of the invention is to provide an easily moved ball valve that can readily be manufactured, used and serviced.

A still further object of the invention is to provide a ball valve which is readily moved under adverse service conditions yet which will remain consistent and substantially uniform in its operation over a protracted time.

Another object of the invention is to provide a generally improved ball valve.

Other objects of the invention, together with the foregoing, are attained in the embodiment of the invention described in the accompanying description and illustrated in the accompanying drawings, in which:

FIGURE 1 is a cross section on an axial plane through a ball valve and actuator constructed pursuant to the invention, certain portions of the mechanism being broken away;

FIGURE 2 is a view of the mechanism shown in FIGURE 1 but taken at right angles to the FIGURE 1 view and showing the parts in elevation, certain portions being broken away to reduce the figure size;

FIGURE 3 is a diagram showing the ball valve in closed position;

FIGURE 4 is a diagram showing the ball valve in partly open position;

FIGURE 5 is a diagram showing the ball valve in more nearly open position; and

FIGURE 6 is a diagram showing the ball valve in position at which the main flow begins.

While the ball valve of the invention can be incorporated in a number of different ways, it has successfully been embodied as shown to a substantially reduced scale in FIGURES 1 and 2. In this embodiment the valve includes a valve housing 6 having a number of different parts, the central housing section 7 partially defining a central chamber 8. Disposed in the central chamber is a valve ball 9. This is essentially spherical and is mounted on a stationary pin 11 itself secured in and extending from a mounting cap 12 held by fastenings 13 in the central section 7 of the valve housing. The valve ball 9 is likewise positioned and rotated by a driving shaft 14 mounted in a bearing sleeve 15 disposed in a cap 16 forming part of the central section 7 of the valve housing. A key 17 inter-connects the drive shaft 14 and the valve ball.

There is a circular cylindrical flow passage 21 through the valve ball, the diameter of the flow passage being approximately half the diameter of the valve ball. Because of the rotary mounting on the drive shaft 14 and the support on the pin 11, the valve ball can be turned between a longitudinal or open position and a transverse or closed position.

Designed substantially to register with the flow passage 21 in the open position of the valve ball is an inlet passage 22 circular cylindrical in contour and of approximately the diameter of the passageway 21. The passage 22 is formed in an inlet body 23 having a flange 24 secured to the central section 7 by suitable fastenings 26.

Similarly, there is provided an outlet passage 27 of a circular cylindrical contour formed in an outlet body 28 having a flange 29 secured to the central section 7 by appropriate fastenings 31. The inlet and outlet passages continue the flow passage 21 in the open position of the valve ball.

Tapped recesses 30 in the central section and appropriate holes in the flanges 24 and 29 permit the reception of fastening bolts (not shown) for holding adjacent pipe flanges against the valve. Preferably the fastenings 26 and 31 are set up rather lightly, the final assembly pressure holding the inlet body 23 and the outlet body 28 against the central section 7 being accomplished by the bolts engaging the tapped recesses 30.

There is provided a sealing ring 32 positioned in the valve housing to abut the valve ball. The ring 32 is constructed substantially as shown in my above identified copending applications. The sealing ring is substantially an annulus of an appropriate material such as "nylon." The ring 32 is initially in flat condition and is so sized that when it is first pressed against the valve ball it is deformed to provide an upstanding portion or sealing lip directed toward the inlet passage 22.

The sealing ring 32 is held in position in sealing engagement with the valve housing around its outer periphery by the inlet body 23. The sealing ring is exposed on its upstream face to the pressure within the inlet passage 22 since there is a substantial clearance way 36 (FIGURE 3) between the surface 37 of the valve ball and the adjacent surface 38 of the inlet body 23. In fact, the opening 36 is enlarged to provide a groove 39 into which the inner portion of the sealing ring 32 can readily flex if necessary. The proportion and arrangement of the way 36 and the groove 39 are such that there is an adequate area for pressure transmission between the groove 39 and the inlet passage 22. Since the valve ball 9 is about twice the diameter of the flow passage 21 the valve ball in its closed position, as shown in FIGURE 3, affords adequate peripheral distance between the edge of the passage 21 and the boundary or edge of the inlet passage 22. Thus, there is adequate room for the sealing ring 32 and for the groove 39 as well as the clearance way 36.

When the valve is in its closed position, as shown in FIGURE 3, the pressure on the inlet side not only presses against the surface of the ball but likewise presses against the sealing ring 32 and effectuates a tight closure so that there is no leakage from the inlet passage into the chamber 8 of the valve housing. Although the valve is well supported by the pin 11 and the operating or driving shaft 14, any pressure displacement of the valve ball is in a downstream direction. Even so, the sealing ring 32 maintains a tight closure.

In the usual circumstance, the pressure within the inlet passage 22 is very much greater than that within the chamber 8 or that within the outlet passage 27, the pressures in the chamber 8 and the passage 27 being always substantially the same under closed condition of the valve. To open the valve under these conditions with a heavy load on the sealing ring 32 is relatively difficult and requires a large amount of force.

Pursuant to the invention, I provide means for relieving the load upon the valve and for making it necessary to use much less force for the opening movement of the valve. To that end I provide in the valve ball 9 a number of small channels 41 which together are considered as a passageway. The channels 41 are preferably formed by drilling holes in the valve ball 9, from the surface 37 thereof to the flow passage 21 therethrough, and are relatively small in individual area. When the valve is closed all of the channels are situated on the downstream side of the sealing ring 32 so that the presence of the passages 41 does not in any way affect the sealing closure of the valve.

When the valve is initially moved out of its closed position; that is, moved out of a position in which the passageway 21 is normal to the through axis of the inlet passage 22 and the outlet passage 27, the leading ones of the channels 41 ride over the edge of the sealing ring 32, as shown in FIGURE 4. Since the channels 41 are relatively small in individual area, the sealing ring edge is well supported and therefore is not substantially deflected by the resulting flow of high pressure fluid from the inlet 22 through the channels 41 into the chamber 8 and the passageway 21.

To prevent substantial outflow from the chamber 8 yet to avoid the necessity of a further seal, the outlet body 28 is preferably formed with an interior spherical surface 43 which approaches as closely as mechanically feasible to the spherical surface of the valve ball 9. The clearance area between the ball and the surface 43 is a function of the difference between the radius of the ball surface and the radius of the interior spherical surface 43. This difference in radii is made as small as feasible, generally being of the order of a very few thousandths of an inch in the usual size valve.

The area for flow between the ball 9 and the outlet body 28 when the valve is substantially in the FIGURE 4 position is preferably somewhat less than the flow area through the passageway 41 made up of whatever channels are then open. This is certainly true when the valve has advanued to the position shown in FIGURE 5 and has uncovered more channels. The point is that flow into the chamber 8 can occur faster than flow out from that chamber can occur. Consequently, there is a pressure build-up within the chamber 8 and within the through passageway 21. After a short time and before the flow passage 21 is really open to the passage 27, the pressure inside the chamber 8, while not precisely that of the inlet passage 22, nevertheless builds up and approaches that high value. Consequently, the force or friction on the sealing ring 32 and on the valve ball is reduced and is solely that due to the difference between the pressure in the inlet passage 22 and the pressure in the chamber 8. Thus, as soon as the valve has been moved slightly from its FIGURE 3 position to its FIGURE 4 position or even to its FIGURE 5 position, for example, the pressure load on the valve is sharply reduced so that further movement of the valve toward open position is readily effectuated. This is still true when the valve gets into its FIGURE 6 position and thereafter in which the passageway 21 is in direct communication with the inlet passage 22 and the outlet passage 27. Through flow in the usual way then takes place.

A similar effect but in reverse order occurs when the valve is closed. When the valve is moved back substantially into its FIGURE 5 position the chamber 8 is nearly at the inlet passage pressure, but when the valve gets say into its FIGURE 4 position or into a position between that shown in FIGURE 4 and FIGURE 3, then the inflow of fluid to the chamber 8 is less than the leakage thereof through the clearance area between the ball and the surface 43. Hence the pressure within the chamber 8 reduces by leakage to substantially that existing in the outlet passage 27. Thus, most of the closing movement of the valve is effectuated under a relatively small differtial pressure or force on the valve. In the closed position, there is a full pressure difference so that the sealing ring is adequately pressed against the valve ball and sealing is complete.

Because of the improved rotational characteristics of the valve, the valve operator can be improved as well and can be especially adapted for the easier valve operation. As shown in FIGURES 1 and 2, the actuator includes a mounting sleeve 51 connected to the cap 16 by a flange 52 and suitable fastenings 53 and also includes a flange 54 connected by appropriate fastenings 56 to a cylinder 57. The sleeve 51, which is stationary, carries a pair of oppositely disposed approximately helical slots 58 and 59 in which bearing rollers 61 on a through pin 62 are engaged. The pin 62 is disposed in a piston rod 66. Between the piston rod and the rollers 61, the pin 62 carries other rollers 67 designed to run in straight or axial slots 68 and 69 in the upper hollow portion of the driving shaft 14. Thus when the pin 62 is moved axially, it is likewise twisted because of the influence of the helical or substantially helical slots 58 and 59 and the twist is imparted to the driving shaft because of the engagement of the rollers 67 with the straight slots 68 and 69.

The piston rod 66 is fastened to a piston 71 operating in the cylinder 57. Pressure fluid is supplied to the cylinder 17 on one side of the piston through an inlet fitting 72 and is similarly supplied to the other end of the cylinder through a connection 73. Certain return stroke regulating mechanisms 74 and 75 are provided for the opposite ends of the cylinder.

Preferably, the pin 62 at one end has an extension 76 designed to engage a limit switch 77 at the upper end of the stroke and to engage another limit switch 78 at the lower end of the stroke. With this mechanism, the valve is operated by power between open and closed positions.

Since the amount of force necessary to turn the valve is substantially reduced throughout most of its rotational stroke, it is possible to contour the channels 58 and 59 in something other than a mathematically exact helix. In practice it is customary to contour these guide channels in such a way that a large leverage or force multiplication is available in the very beginning or initial movement of the valve ball from its closed position or in the final movement into closed position. Since the pressure tends to equalize after the valve ball has gotten into its FIGURE 4 and FIGURE 5 positions, considerably less force is then necessary and the pitch of the guides can then be made much steeper.

What is claimed is:

1. A ball valve comprising a valve housing having a central chamber, a valve ball disposed in said chamber, means for mounting said valve ball solely for rotation in said valve housing between open position and closed position, means defining a flow passage through said valve ball, means defining an inlet passage in said valve housing adapted to register with said flow passage in said open position of said ball, means defining an outlet passage in said valve housing adapted to register with said flow passage in said open position of said ball, a sealing ring seated in said valve housing surrounding said inlet passage and adapted to abut said valve ball, means defining a surface on the interior of said chamber and surrounding said outlet passage, the radial distance between said surface and said ball having a predetermined value to establish a predetermined leakage area between said valve ball and said surface when said valve ball is in and near said closed position until in said open position, and means defining a passageway through said valve ball from said inlet passage to said flow passage when said valve ball is near said closed position until in said open position, the cross-sectional area of said passageway being greater than said predetermined leakage area.

2. A ball valve comprising a valve housing having a central chamber and having inlet and outlet passages communicating with said chamber, means forming a spherical surface in said housing between said chamber and said outlet passage, means constituting a pressure sealing ring in said housing between said chamber and said inlet passage, a valve ball in said chamber and movable to control flow between said inlet and outlet passages, said valve ball having a flow passage therethrough adapted for movement from open position with said flow passage registering with said inlet and outlet passages, to closed position with said passages out of register, said ball having a radius closely approaching said spherical surface to define a predetermined leakage area in an intermediate position of said ball between said open and closed positions, and means in said ball constituting a shunt passageway having an area greater than said predetermined area and extending around said sealing ring in said intermediate position of said ball.

3. A ball valve comprising a valve housing having a central chamber and having inlet and outlet passages communicating with said chamber, a valve ball in said chamber and having a flow opening therethrough with a portion of the surface of said ball abutting a wall adjacent said outlet passage so as to define a minimum path for leakage flow, means for rotating said ball into a first position to connect and into a second position to disconnect said flow opening with said inlet and outlet passages, means in said ball forming channels between the surface of said ball adjacent said inlet passage, and said flow opening for enabling the passage of considerably more fluid volume under pressure than said path for leakage flow, a sealing means in said housing and abutting the surface of said ball between said channel forming means and said flow opening when said ball is intermediate said first position and said second position, the leakage flow past the surface of said ball into said outlet passage being less than flow through said channel forming means when said channel forming means and said inlet passage are in communication, and means for enabling the pressure developed as a consequence of the difference in fluid flow through said channel means and said minimum path to be applied against said sealing means for relieving the resistance of said sealing means to movement of said ball.

4. A ball valve comprising a valve housing having a central chamber and having inlet and outlet passages communicating with said chamber, a valve ball in said chamber and having a flow opening therethrough, means for mounting said ball in said housing solely for rotation, means for rotating said ball in said housing between an open position and a closed position, a sealing means in said housing surrounding said inlet passage and abutting said ball, means forming a spherical surface within said housing surrounding said outlet passage and closely approaching said ball to leave a predetermined clearance area, and means forming a passageway in said ball from said inlet passage to said flow opening and around said sealing means, said passageway having a flow area in one position of said ball greater than said predetermined clearance area in said one position of said ball.

5. A ball valve comprising a valve housing having a central chamber and having inlet and outlet passages communicating with said chamber, a valve ball in said chamber and having a flow opening therethrough, means for rotating said ball into a first position to connect and into a second position to disconnect said flow opening with said inlet and outlet passages, means forming holes in said ball extending from the surface thereof adjacent said inlet passage to said flow opening therein, a sealing ring in said housing and abutting said ball surface between said holes and said flow opening when said ball is in said second position, said sealing ring being secured in sealing engagement with said housing around its outer periphery, and means including said holes for tending to equalize the pressure applied against said sealing ring responsive to the movement of said ball to bring said holes into a position of communication with said inlet passageway.

References Cited in the file of this patent

UNITED STATES PATENTS

| | | |
|---|---|---|
| 512,892 | Munger | Jan. 16, 1894 |
| 1,066,623 | Kahn | July 8, 1913 |
| 2,547,116 | Gould | Apr. 3, 1951 |
| 2,672,885 | Cox et al. | Mar. 23, 1954 |
| 2,699,555 | Green | Jan. 18, 1955 |
| 2,882,010 | Bryant | Apr. 14, 1959 |

FOREIGN PATENTS

| | | |
|---|---|---|
| 1,922 | Great Britain | Aug. 22, 1859 |
| 554,267 | France | Feb. 27, 1923 |
| 744,193 | Germany | Jan. 12, 1944 |
| 905,547 | France | Apr. 23, 1945 |
| 883,374 | Germany | July 16, 1953 |
| 761,890 | Germany | Jan. 11, 1954 |